United States Patent [19]
Desjardins et al.

[11] Patent Number: 6,023,804
[45] Date of Patent: Feb. 15, 2000

[54] TOOL FOR REMOVING INSULATION FROM WIRES

[75] Inventors: John P. Desjardins, Windsor, Canada;
Tony J. Azar, 3555 North Service Rd., East, Windsor, Canada, N8W 5R7

[73] Assignee: Tony J. Azar; CAX

[21] Appl. No.: 09/120,082

[22] Filed: Jul. 21, 1998

[30] Foreign Application Priority Data

Jul. 24, 1997 [CA] Canada .................................. 2211275

[51] Int. Cl.⁷ .................................................... B25B 7/22
[52] U.S. Cl. ................................... 7/108; 7/156; 30/90.4
[58] Field of Search .............................. 7/107, 108, 156, 7/165; 81/9.4; 30/90.4

[56] References Cited

U.S. PATENT DOCUMENTS

| 2,635,337 | 4/1953 | Mercy | 7/158 X |
| 2,674,796 | 4/1954 | Herold | 7/107 X |
| 2,868,049 | 1/1959 | Radcliffe | 7/107 X |
| 3,902,206 | 9/1975 | Naquin | 7/107 |

Primary Examiner—David A. Scherbel
Assistant Examiner—Anthony Ojini
Attorney, Agent, or Firm—Anthony J. Casella; Gerald E. Hespos

[57] ABSTRACT

A tool for stripping insulation from wire has a handle and a knife blade extending therefrom. The knife blade has a flat surface and a sharp edge. A secondary blade is provided on the knife blade, offset therefrom.

11 Claims, 2 Drawing Sheets

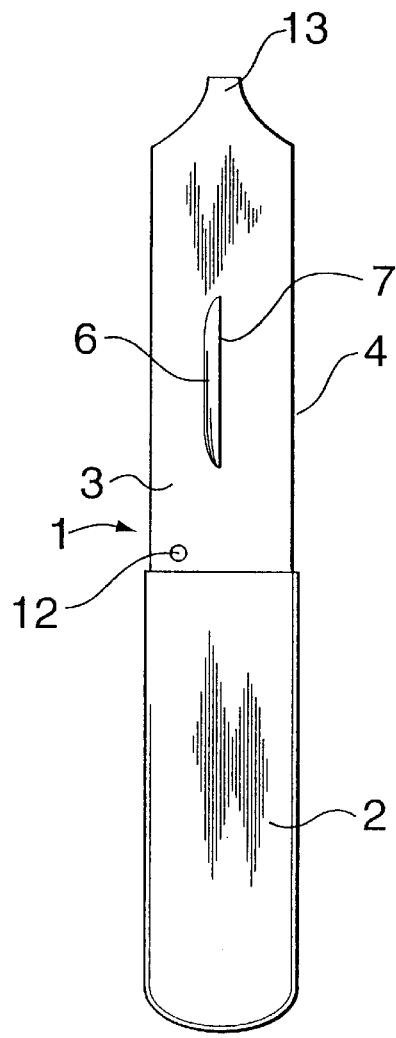
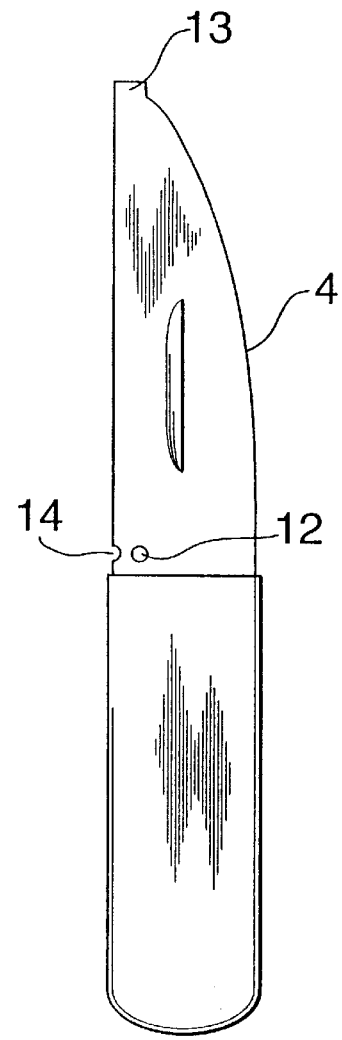
FIG. 4   FIG. 5
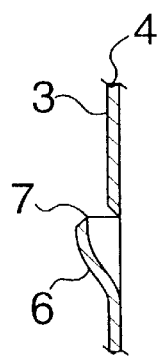
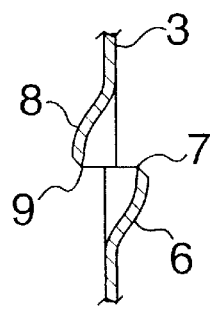
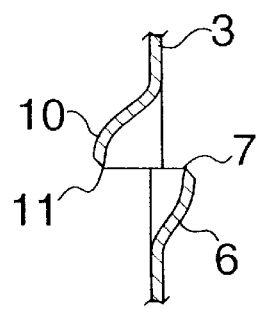
FIG. 6   FIG. 7   FIG. 8

TOOL FOR REMOVING INSULATION FROM WIRES

FIELD OF THE INVENTION

The present invention relates to the filed of hand tools for stripping insulation from electrical wires and cables.

BACKGROUND OF THE INVENTION

There exists a need for a tool that can be used to quickly and effectively remove insulation, such as plastic (polyethylene, PVC, etc.) from electrical wires and cables. Many tools and techniques intended to be used to accomplish this task exist, but there are drawbacks associated with each. For instance, a common type of tool for stripping insulation comprises a metal strip with a sharpened notch cut in it. The insulated wire is placed in the notch, and the strip then drawn to the end of the wire, to pull the insulation away. Such a tool is limited in its application, though, since the size of the notch will match only a limited number of wire sizes.

Wire stripping pliers are also known. These are provided with heads that have aligned notches to close over a wire, and cut the insulation, to permit it to be pulled away. Again, however, the notches are sized to particular wire sizes, and so such a tool has limited usage. That is, if the notches are closed over a wire that is too large, the wire may be cut by the notches. If they are closed over a wire that is too small, the insulation will not be caught.

Moreover, in cable construction, it is common to find an insulating or protective layer over two or three wires, and other elements, including strength elements, braided cushioning, and the like. To connect a cable, then, it is often necessary to cut away several layers of insulation, sheathing and fibrous elements, before the insulated wires requiring connection are exposed. Therefore, it is common for electricians to carry all purpose knives, with sharp cutting edges for cutting away layers.

In view of the foregoing, the object of the present invention is to provide a simple and effective tool for stripping insulation from wires of a variety of sizes, without damaging the metal core of the wire. A further object of the present invention is to provide an all purpose knife with a piercing and cutting blade for stripping the outer, fill, and strength elements from a cable, and an integral insulation stripping blade for stripping the insulation from wires, regardless of the gauge of the wire, or the thickness of the insulation thereon.

In a broad aspect, then, the present invention relates to a tool for stripping insulation from wire, said tool having a handle and a knife blade extending therefrom, said knife blade having a flat surface and a sharpe edge, wherein a secondary blade is provided on said knife blade, offset therefrom.

BRIEF DESCRIPTION OF THE DRAWINGS

In drawings that illustrate the present invention:

FIG. 4 is a side view of a second embodiment of the present invention;

FIG. 5 is a side view of a third embodiment of the present invention;

FIG. 6 is a cross-sectional view, through line IV—IV in FIG. 3;

FIG. 7 is a cross-sectional view, similar to FIG. 6, showing a second form of insulation stripping blade in connection with the tool of the present invention; and FIG. 8 is a cross-section view, similar to FIG. 6 showing a third form of insulation stripping blade in connection with the tool of the present invention.

DETAILED DESCRIPTION OF THE DRAWINGS

Figure 1:
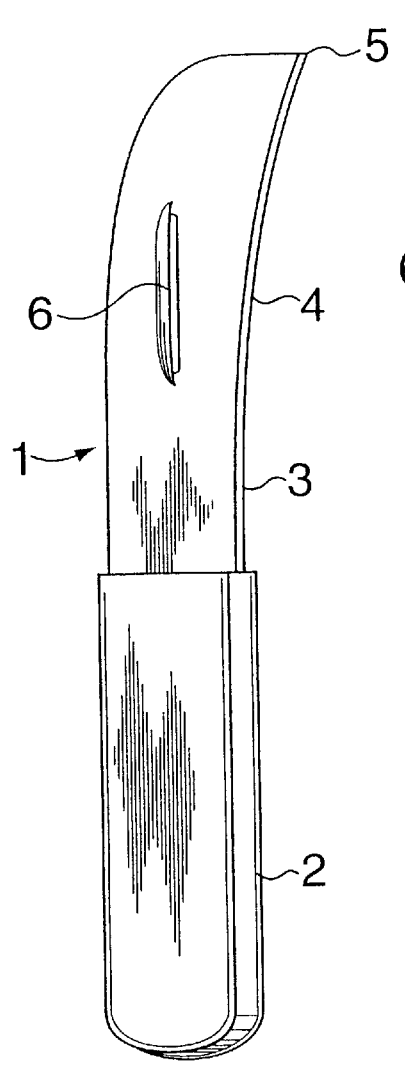
FIG. 1 is a perspective view of a tool according to a first embodiment of the present invention.
Figure 2:
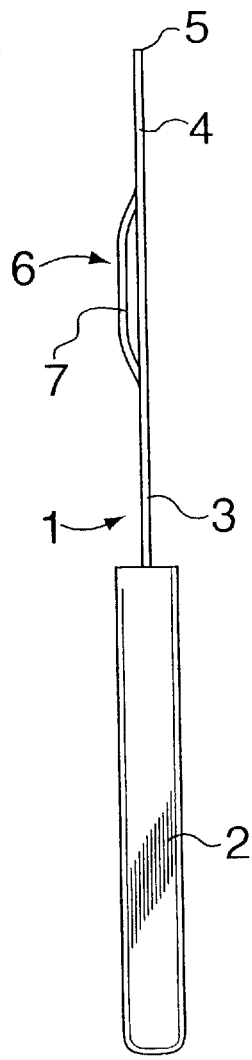
FIG. 2 is a side view of the tool shown in FIG. 1 from the blade edge thereof.
Figure 3:
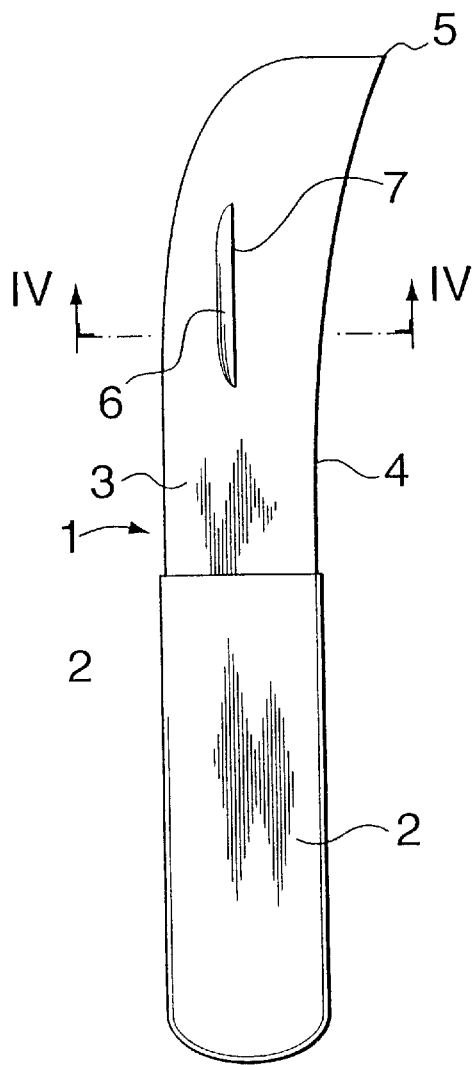
FIG. 3 is a front view thereof.

Referring to the drawings, FIGS. 1–3 and 6 illustrate the most basic embodiment of the present invention. The tool 1 of the present invention may, as illustrated in these drawings, have an overall shape resembling a utility knife, with a handle 2, and a blade 3. The blade has a cutting edge 4, and a piercing point 5. In a knife of this sort, the blade edge 4 is, preferably, generally concavely curved in the region of the point 5, to permit the point to be drawn over a substrate to be cut, such as the sheathing for a cable.

The blade 3 is provided with a centrally located insulation skinning element 6, which is formed integrally with the blade, by the offsetting of a portion of the blade, and the sharpening of the edge 7 thereof. The edge 7, as shown in FIG. 4, is substantially parallel to the blade 3 of the tool, so that the edge 7 of the insulation skinning element can be drawn over a wire to remove insulation therefrom, in the manner of a plane.

The skinning element 6 of the blade may be formed by punching the element 6 into the blade, and then sharpening the edge 7 thereof.

As illustrated in FIG. 7, in a second form, a version of the embodiment illustrated in FIGS. 1–3 and 6, suitable for right or left-handed use is provided. In this embodiment, elements 6 and 8 are offset from different sides of the blade, an equal distance, to provide oppositely directed sharp skinning edges 7 and 9. Edge 7 is suitable for use with the handle in one hand, and edge 9 suitable for use with the other hand.

In this regard, it will be noted that depending on the user, and their preference, element 7 or element 9 may be considered right-handed, and vise-versa. That is, a right-handed user may choose to grasp handle 2 with the right hand, and skin a wire from beneath same, exerting pressure with the right thumb on the wire to bring it to bear against the edge 7 of element 6. Alternatively, the user may grasp the handle 2 in the right hand, and press downwardly on an insulated wire resting on a work surface, and skin the insulation off of it by moving the edge 7 against the insulation. In either event, it will be observed that for a left-handed user, the oppositely directed edge 9 will be utilized.

In a third form as shown in FIG. 8, the tool has a blade 3 that has two elements 6, 10, with cutting edges 7, 11 offset different depths. This feature is useful in circumstances wherein two thicknesses of insulation are frequently encountered. This circumstance occurs, for instance, in residential construction.

FIGS. 4 and 5 illustrate useful combination tools embodying the present invention.

In FIG. 4, the tip of blade 3 is formed as a slotted screwdriver head 13. Near the base of the blade, a small circular aperture 12 is formed in the blade. Aperture 12 is useful in assisting an electrician to bend the end of a wire into a loop for connection to an electrical switch, outlet, panel, or the like.

In the embodiment illustrated in FIG. 5, blade edge 4 is cured, as is preferred by some persons. Slotted screwdriver head 13 is also formed at the tip of the blade, and aperture 12 is provided at the base of the blade. Moreover, a notch 14 is formed on the back edge of the blade, for quick removal of small amounts of insulation from wires.

Utilizing the tool of FIGS. 4 or 5, then, an electrician can prepare and install a cable to a switch panel, outlet or the like without changing tools.

It is to be understood that the examples described above are not meant to limit the scope of the present invention. It is expected that numerous variants will be obvious to the person skilled in the field to which the present invention pertains without any departure from the spirit of the invention. The appended claims, properly construed, form the only limitation upon the scope of the invention.

The embodiments of the invention in which an exclusive property or privilege is claimed are defined as follows:

1. A tool for stripping insulation from wire, said tool having a handle and a knife blade extending therefrom, said knife blade having a flat surface and a sharp edge, a secondary blade being provided on said knife blade, the secondary blade being formed as a lateral projection of a portion of said knife blade and being offset from the knife blade, the secondary blade extending substantially parallel to the sharp edge of said knife blade.

2. A tool for stripping insulation from wire as described in claim 1, wherein the secondary blade defines a secondary edge offset from the flat surface of said knife blade to define a gap therebetween.

3. A tool for stripping insulation from wire as described in claim 2, wherein said secondary blade, rearwardly of the secondary edge thereof is contiguous with said knife blade.

4. A tool for stripping insulation from wire as described in claim 3, wherein the knife blade has opposed first and second flat surfaces, the secondary blade being offset from the first surface of the knife blade, the tool further comprising a tertiary blade similar to said secondary blade and offset from the second flat surface of said knife blade.

5. A tool for stripping insulation from wire as described in claim 4, wherein the edges of the knife blade and the secondary blade project substantially in a common direction, and wherein said tertiary blade has a cutting edge projecting oppositely from the edges of said knife blade and said secondary blade.

6. A tool for stripping insulation from wire as described in claim 5, wherein said tertiary blade cutting edge is offset from said second flat surface of said knife blade to define a gap therebetween, the gap between the tertiary blade cutting edge and the knife blade being about equal to the gap between the edge of the secondary blade and the knife blade.

7. A tool for stripping insulation from wire as described in claim 5, wherein said tertiary blade cutting edge is offset from the second flat surface of said knife blade to define a gap therebetween, the gap between the tertiary blade cutting edge and the knife blade being not equal to the gap between the edge of the secondary blade and the knife blade.

8. A tool as claimed in claim 2, wherein said knife blade has a tip at its end remote from said handle formed as a flat-headed screwdriver.

9. A tool as claimed in claim 8, wherein said knife blade has a substantially circular aperture formed near the handle of the tool and adjacent an edge of the knife blade opposite said sharp edge.

10. A tool as claimed in claim 9, wherein said knife blade has a substantially semicircular notch formed therein adjacent said aperture.

11. A tool as claimed in claim 10, wherein the sharp edge of said knife blade is curved.

* * * * *